No. 860,147. PATENTED JULY 16, 1907.
F. A. ORTON.
CLEANING AND GRADING MACHINE.
APPLICATION FILED AUG. 14, 1905.

Witnesses
Inventor
Frederick A. Orton
by Hazard & Harpham
Attorneys.

UNITED STATES PATENT OFFICE.

FREDRICK A. ORTON, OF SANTA MONICA, CALIFORNIA, ASSIGNOR OF ONE-HALF TO SOUTHWEST WAREHOUSE COMPANY.

CLEANING AND GRADING MACHINE.

No. 860,147.  Specification of Letters Patent.  Patented July 16, 1907.

Application filed August 14, 1905. Serial No. 274,203.

*To all whom it may concern:*

Be it known that I, FREDRICK A. ORTON, a citizen of the United States, residing at Santa Monica, in the county of Los Angeles and State of California, have invented new and useful Improvements in Cleaning and Grading Machines, of which the following is a specification.

The object of my invention is to provide a simple, and reliable apparatus by means of which beans, seeds, grain or other like articles may be cleaned or graded. I accomplish this object by means of the device described herein and shown in the accompanying drawings in which:—

Figure 1:
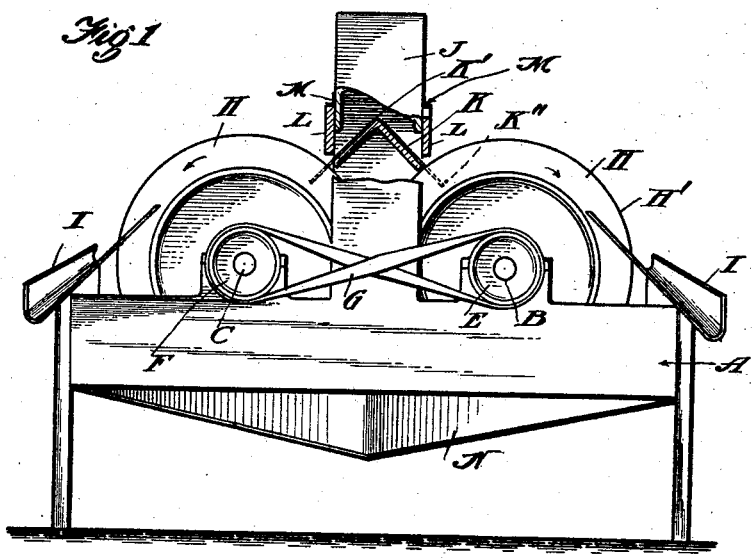
Figure 2:
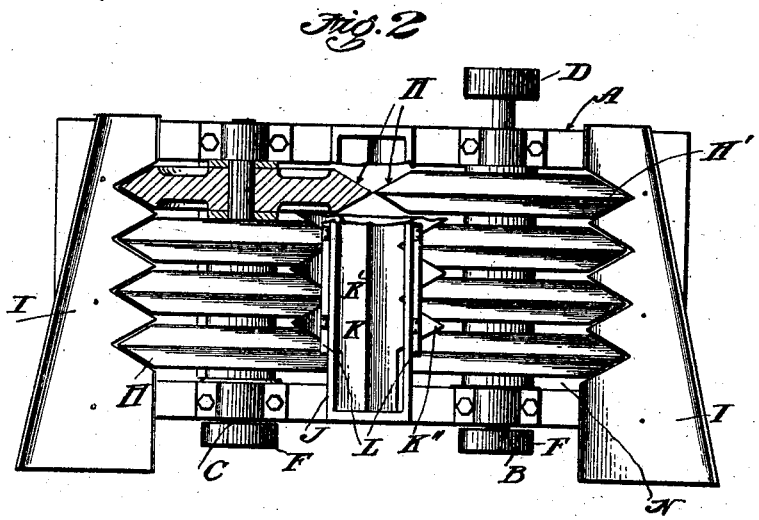

Figure 1—is an end view of my improved cleaning and grading machine. Fig. 2—is a plan view thereof, one of the grading disks being shown in central transverse section.

In the drawings A is the frame of my grader upon which are mounted two rotary shafts B and C. The driving shaft B carries on one end a driving pulley D connected to a source of power (not shown) and has keyed to the other end a pulley E. Keyed to the driver shaft C is pulley F. A crossed belt G extends from pulley E to pulley F to impart a reverse movement to the different shafts. Keyed to these shafts are a number of grading disks H which have beveled edges H'. These disks may be spaced apart on the shafts so that a space will be left between the disks just large enough to allow the beans to pass downwardly between them, but small enough to prevent any substance larger than a bean from passing down between them onto the discharge apron N.

On each side of the machine I have placed a chute "I" which has a number of D-shaped projections on the sides next to the disks to fit the peripheries thereof for receiving whatever is carried over by the disks. On the top of the frame is mounted the feed-hopper J which has a double inclined bottom K, the ridge K' thereof projecting upwardly into the center of the hopper and dividing the contents as it passes downwardly to the discharge openings. Secured to bottom of the hopper and at the lower edge of each incline are a series of toothed guards K'' adapted to project into the openings formed by the adjacent beveled edges of the grader disks. These guards K'' carry the beans or other articles operated on between the adjacent beveled edges of the grader disks.

To permit the beans to be fed out of the hopper along the sloping bottom and not be thrown beyond the grader disks, I have provided doors L hinged as at M on each side. These swinging doors will also serve to prevent the beans from being fed too rapidly to the grading disks.

Motion being imparted to the machine through the driving pulley the grader disks will rotate in the direction indicated in Fig. 1 of the drawings, and the beans or other articles placed in the hopper will pass downwardly to the grading disks, and all beans or foreign substances of a larger diameter than the space between the disks will be carried over to the discharge chutes I. The spaces between the grader disks will indicate the diameter of the largest substance that can pass downwardly onto the discharge apron N. To clean the beans the space between the disks is adjusted so as to permit the whole beans to pass downwardly between the disks and out through the discharge apron N. By increasing or decreasing the spaces between the disks (the disks being adjustable on the shafts) the substances operated on can be graded into any desired size.

Having described my invention what I claim as new and desire to secure by Letters Patent is:—

1. A device of the class described, comprising a frame; revoluble shafts mounted in said frame; a series of grader disks equally spaced apart, having oppositely inclined adjacent frusto-conical faces, adjustably secured to each of said shafts; a hopper having a double inclined bottom and discharge openings along the edges adjacent the periphery of said series of disks, said hopper secured to the frame above and between said grader disks; means secured to the hopper adjacent the discharge openings to regulate the flow of material from said hopper; and means to rotate said shafts in opposite directions simultaneously.

2. A device of the class described, comprising a frame; revoluble shafts mounted in said frame; a series of grader disks equally spaced apart, having oppositely inclined adjacent frusto-conical faces, adjustably secured to each of said shafts; a hopper having discharge openings along the edges adjacent the periphery of said series of disks, said hopper secured to the frame above and between said grader disks; a plurality of guards secured to the hopper adjacent the discharge openings, said guards projecting between said disks; and means to rotate said shafts in opposite directions simultaneously.

3. A device of the class described, comprising a frame; revoluble shafts mounted in said frame; a series of grader disks equally spaced apart, having oppositely inclined adjacent frusto-conical faces, adjustably secured to each of said shafts; a hopper having discharge openings along the edges adjacent the periphery of said series of disks, said hopper secured to the frame above and between said grader disks; a plurality of guards secured to the hopper adjacent the discharge openings, said guards projecting between said disks; means to regulate the flow of material from said hopper; and means to rotate said shafts in opposite directions simultaneously.

4. A device of the class described, comprising a frame; revoluble shafts mounted in said frame; a series of grader disks equally spaced apart, having oppositely inclined adjacent frusto-conical faces, adjustably secured to each of said shafts; a hopper having discharge openings along the edges adjacent the periphery of said series of disks, said hopper secured to the frame above and between said grader disks; a plurality of guards secured to the hopper adjacent the discharge openings, said guards projecting between said disks; means to regulate the flow of material from said hopper; discharge chutes having toothed inner edges, one secured to each end of said frame adjacent the peripheries of said series of disks, said teeth forming guards and projecting between the adjacent beveled edges of said disks; and means to rotate said shafts in opposite directions simultaneously.

In witness that I claim the foregoing I have hereunto subscribed my name this 28th day of July, 1905.

FREDRICK A. ORTON.

Witnesses:
L. G. DEERING,
S. W. ODELL.